United States Patent

[11] 3,568,625

| [72] | Inventor | Guido D. Cilento<br>Southington, Conn. |
|---|---|---|
| [21] | Appl. No. | 773,436 |
| [22] | Filed | Nov. 5, 1968 |
| [45] | Patented | Mar. 9, 1971 |
| [73] | Assignee | Fairfield Facility Commercial Filters,<br>Division of the Carborundum Co.<br>Lebanon, Ind. |

[54] DIFFERENTIAL PRESSURE INDICATOR
7 Claims, 2 Drawing Figs.

[52] U.S. Cl. .................................................. 116/70,
148/31.57, 210/90, 335/302
[51] Int. Cl. ..................................................... G01l 19/12
[50] Field of Search ........................................... 116/65, 70,
114, 117; 33/Mag. Digest; 75/21, 170; 148/31.57;
317/159; 335/295, 302; 340/227; 210/85, 90

[56] References Cited
UNITED STATES PATENTS

| 1,976,230 | 10/1934 | Kato et al. | 335/302 |
|---|---|---|---|
| 2,280,437 | 4/1942 | Levesque | 335/295 |
| 2,694,166 | 11/1954 | Hadfield | 148/31.57 |
| 2,907,992 | 10/1959 | Bronikowski | 340/227 |
| 3,026,903 | 3/1962 | Roach | 137/533.13 |
| 3,089,066 | 5/1963 | Uc et al. | 317/159 |
| 3,140,690 | 7/1964 | Siebel | 116/70 |
| 3,154,049 | /1964 | Smith et al. | 116/70 |
| 3,220,375 | 11/1965 | Gruber et al. | 116/70 |
| 3,354,336 | 11/1967 | Rennick | 335/302X |
| 3,364,897 | 1/1968 | Mouwen | 116/70 |
| 3,412,706 | 11/1968 | Topol et al. | 116/70 |
| 3,413,951 | 12/1968 | Keil et al. | 116/70 |
| 3,442,248 | 5/1969 | Parkinson et al. | 116/70 |
| 3,448,716 | 6/1969 | Smith | 116/70 |

*Primary Examiner*—Louis J. Capozi
*Attorney*—March, Gillette and Wyatt

ABSTRACT: A differential pressure-indicating device has an indicating chamber and a pressure sensitive chamber separated by a fixed magnet of variable strength. While a rod in the pressure sensitive chamber abuts the fixed magnet, the indicator cannot be triggered. Movement of the rod away from the magnet triggers the indicator. Means are provided to prevent return of the rod to abut the fixed magnet until the filter is replaced.

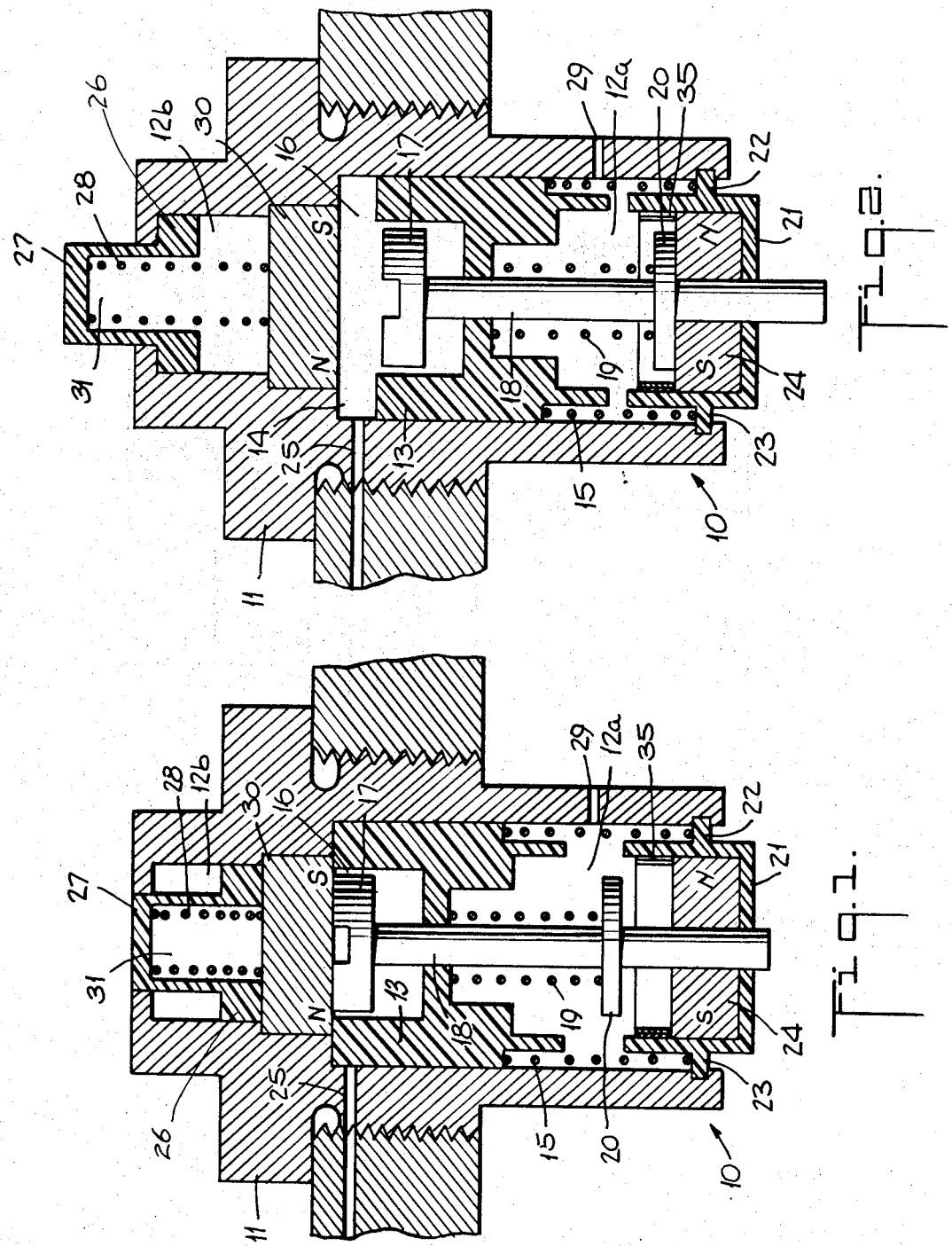

DIFFERENTIAL PRESSURE INDICATOR

BACKGROUND OF THE INVENTION

Differential pressure-indicating devices are known in the art. Such devices are so designed that a fluid pressure differential triggers an indicator. This triggering of the indicator is a sign that the filter is no longer functioning properly and should be replaced. While the machine or apparatus to which the differential pressure indicator is attached is in operation, the indicator cannot be reset to nonindicating position. Once the machine or apparatus is no longer operating, it is possible to reset and retain the indicator in nonindicating position without replacing the filter. Should this occur, either through haste or error, the machine or apparatus can then be restarted with the malfunctioning filter. This would not be too serious an occurence in the case of stationery apparatus or machines which can be inspected as a matter or routine. In the case of mobile apparatus or machinery however, it is usually impossible or impractical to carry out an inspection while the machine or apparatus is carrying out its designed function. The danger exists, therefore, that serious damage may occur because the indicator can be reset once the machine or apparatus has been stopped without changing the filter.

OBJECTS OF THE INVENTION

It is, therefore, an object of the present invention to provide an improved differential pressure indicator. Another object is to provide a differential pressure indicator wherein the indicator cannot be reset until the filter is changed. Another object is to provide a differential pressure indicator having means for maintaining the indicator in indicating position; once the indicator has been triggered by a predetermined pressure differential, until the filter is changed. These and other objects of the present invention will be apparent from the following description.

SUMMARY OF THE INVENTION

A differential pressure indicator comprises a housing having a an indicator positioned within the housing. The indicator is maintained in nonindicating position within the housing by a fixed magnet. A magnet is located in the housing coaxially with the indicator. Movement of the piston away from the first position by a predetermined pressure differential triggers the indicator by carrying with it rod means abutting the fixed magnet and thereby reducing the holding power of the fixed magnet. Means are provided to retain the rod means away from the first position once it has moved in response to a predetermined pressure differential. The indicator can only be reset after the rod means is returned to its first position. This can be done only by disassembling the pressure indicator and pushing the reset rod back to its original position.

The indicator and piston are separated by an element which is a magnet. It is of such a type that it will attract the indicator when the piston is a first position and have greatly reduced attraction for the indicator when the piston is away from the first position.

The invention is directed to a differential pressure indicating device comprising a housing containing an indicating chamber and a pressure sensitive chamber, said chamber being separated by a first-fixed magnetic means, indicating means located in the indicating chamber, second-fixed magnetic means located in the pressure sensitive chamber, piston means located in the pressure sensitive chamber, the piston means movable towards and away from a first position, the piston means having rod means slidably mounted therein, the rod means having a first position wherein magnetically attracted means located at one end thereof abut the first-fixed magnet, and a second position wherein magnetically attracted means located at a point remote from the first-fixed magnet abut the second-fixed magnetic means, the indicator means movable towards and away from the fixed magnetic means and normally retained towards the first-fixed magnetic means by magnetic attraction when the rod means is in the first position.

The invention is directed to such a device wherein the indicator is held by the first-fixed magnet against a force exerted by bias means when the magnetically attracted means on the rod means abut the first-fixed magnet.

The invention is directed to such a device wherein the first-fixed magnetic means separating the indicating chamber and the pressure sensitive chamber comprises magnetic means which attract the indicating means when the rod means is in the first position and which has greatly reduced attraction for the indicating means when the rod means is in the second position.

The invention is directed to such a device wherein when the rod means has moved from the first to the second position, the second-fixed magnetic means in the pressure sensitive chamber prevents return of the rod means to the first position.

The invention is directed to such a device wherein when the rod means is in the first position, movement of the piston means away from the first position moves the rod means to the second position. The invention is directed to such a device wherein bias means within the piston means move the rod means to the second position. The invention is directed to such a device wherein the bias means engage the magnetically attracted means located at a point remote from the first fixed magnet.

BRIEF DESCRIPTION OF THE DRAWING

FIGS. 1 and 2 are views in longitudinal section taken through a typical differential pressure indicator according to the invention.

DETAILED DESCRIPTION

The differential pressure indicator 10 of FIGS. 1 and 2 comprises a housing 11 having a wider lower cylindrical bore 12a and a narrower upper cylindrical bore 12b. The two bores are separated by fixed magnet 30. Mounted within the upper portion of the bore 12a is a tubular piston 13, the forward portion of which abuts flange 14 and fixed magnet 30. Piston 13 is slidably supported in bore 12a and is normally urged toward flange 14 and magnet 30 by bias means which in this embodiment is a coil spring 15. The upper portion of tubular piston 13 contains a chamber 16 adapted to receive disc 17. One side of disc 17 is attached to rod 18. Disc 17 is urged toward magnet 30 by the magnetic attraction of magnet 30. A disc 20 of magnetic material is mounted near the other end of rod 18. The lower end of bore 12a is adapted to receive a cap 21 which forms a closure for housing 11. Bimetallic strip 35 is mounted concentrically with cap 21. Cap 21 has flange members 22 and 23 which serve to anchor coil spring 15. Fixed magnetic means 24 is provided within cap 21.

A duct 25 communicating with a fluid under pressure leads into the forward portion of the chamber 16. Duct 29 permits fluid to leave chamber 16. The narrower upper bore 12b contains cylindrical member 26 mounted coaxially with magnetic means 30. Member 26 is slidably supported in bore 12b and its upper end forms indicator 27. Member 26 is urged away from magnetic means 30 by a bias means which in this embodiment is a coil spring 28 mounted within a recess 31 within member 26.

Element 30 is formed of magnetic material which attracts member 26 when disc 17 is in its first position, as shown in FIG. 1 and which has a greatly reduced attraction for member 26 when disc 17 is away from its first position. Alnico VIII is an example of such a material of variable magnetic strength.

The operation of the pressure sensitive device is shown by comparing FIGS. 1 and 2. In FIG. 1 member 26 and disc 17 are attracted towards each other whereby indicator 27 is retained in housing 11 and is not visible. As long as the filter functions properly, the pressure never the upstream side of the filter, that is, the side containing the material which is to be filtered, never exceeds a predetermined value. As the filter becomes clogged, however, the pressure on the upstream side increases. Duct 25 is in communication with the upstream side of the filter. When the increase in pressure reaches a predetermined value, the fluid entering chamber 16 from duct 25 forces piston 13 away from magnet 30. The movement of the piston 13 carries with it rod 18, plate 20, and disc 17 by compressive action on spring 19. Plate 20 then abuts and is held by magnetic means 24 in cap 21. When element 30 is made of a material such as Alnico VIII, member 26 carrying indicator 27 will no longer be attracted to element 30 when piston 13 is away from its first position. Spring 28 will then urge indicator 27 into exposed position as shown in FIG. 2. As long as disc 17 is retained away from element 30 by means 24 or 19, or both, the indicator 27 cannot be reset.

To restore disc 17 to its first position, it is necessary to disassemble the device and manually move disc 17 to its first position by pushing rod 18. Once the device is disassembled there is no longer danger that the filter element will not be replaced. Hence, the present invention provides apparatus which not only indicates when a filter needs replacement, but insures that the indicator cannot be reset without replacing the faculty filter.

During cold conditions when excessive differential pressures can be caused by thick or viscous fluid, a temperature sensitive bimetallic strip 35 will contract inwardly and block plate 20 from moving under the urge of spring 19 caused by action of fluid pressure on piston 13. Therefore disc 17 will not move and the device will not indicate at low predetermined temperatures.

I will not be understood that the foregoing description with the details of exemplary structure is not to be construed in any way to limit the invention, but that modification may be made thereto without departing from the scope of the invention as set forth in the following claims.

I claim:

1. A differential pressure-indicating device comprising a housing containing an indicating chamber and a pressure sensitive chamber, said chambers being separated by a first-fixed magnetic means, indicating means located in the indicating chamber, second-fixed magnetic means located in the pressure sensitive chamber, piston means located in the pressure sensitive chamber, the piston means movable towards and away from a first position, the piston means having rod means slidably mounted therein, the rod means having a first position wherein magnetically attracted means located at one end thereof abut the first fixed magnet, and a second position wherein magnetically attracted means located at a point remote from the first-fixed magnet abut the second-fixed magnetic means, the indicator means movable towards and away from the first-fixed magnetic means and normally retained towards the first-fixed magnetic means by magnetic attraction when the rod means is in the first position.

2. A device according to claim 1 wherein the indicator is held by the first-fixed magnet against a force exerted by bias means when the magnetically attracted means on the rod means abut the first-fixed magnet.

3. A device according to claim 1 wherein the first-fixed magnetic means separating the indicating chamber and the pressure sensitive chamber comprises magnetic means which attract the indicating means when the rod means is in the first position and which has greatly reduced attraction for the indicating means when the rod means is in the second position.

4. A device according to claim 1 wherein when the rod means has moved from the first to the second position, the second-fixed magnetic means in the pressure sensitive chamber prevents return of the rod means to the first position.

5. A device according to claim 1 wherein when the rod means is in the first position, movement of the piston means away from the first position moves the rod means to the second position.

6. A device according to claim 5 wherein bias means within the piston means move the rod means to the second position.

7. A device according to claim 6 wherein the bias means engage the magnetically attracted means located at a point remote from the first-fixed magnet.